United States Patent [19]

Naito et al.

[11] 4,221,862

[45] Sep. 9, 1980

[54] METHOD OF PRODUCING FINELY DIVIDED POLYMER PARTICLES

[75] Inventors: Kenji Naito; Keitaro Ohe, both of Odawara; Nobuo Tsuji, Minami-ashigara, all of Japan

[73] Assignee: Fuji Photo Film Co., Ltd., Minami-ashigara, Japan

[21] Appl. No.: 700,364

[22] Filed: Jun. 28, 1976

[30] Foreign Application Priority Data

Jun. 27, 1975 [JP] Japan ............................... 50-79892

[51] Int. Cl.$^2$ ............................................... G03C 1/02
[52] U.S. Cl. ................................... 430/536; 252/316; 264/5; 430/537
[58] Field of Search ............... 264/182, 5, 14, 4, 117; 96/94 R; 162/164 R; 8/115.5; 252/316; 260/29.64 N, 29.64 XA; 528/502, 503; 430/536, 537

[56] References Cited

U.S. PATENT DOCUMENTS

| | | | |
|---|---|---|---|
| 2,891,055 | 6/1959 | Sloan et al. | 264/5 |
| 3,042,970 | 7/1962 | Terenzi | 264/14 |
| 3,051,545 | 8/1962 | Steuber | 264/182 |
| 3,070,835 | 1/1963 | Alsys | 264/14 |
| 3,154,530 | 10/1964 | Mullen | 528/502 |
| 3,748,277 | 7/1973 | Wagner | 264/4 |
| 3,764,572 | 10/1973 | Rosenthal | 264/117 |
| 3,790,497 | 2/1974 | Sato et al. | 264/4 |
| 3,870,542 | 3/1975 | Ida et al. | 8/115.5 |
| 3,872,023 | 3/1975 | Baum et al. | 264/4 |
| 3,914,354 | 10/1975 | Ueki et al. | 264/3 |
| 3,925,323 | 12/1975 | Turnbull | 528/502 |
| 3,933,579 | 1/1976 | Kershaw et al. | 162/164 R |
| 3,943,115 | 3/1976 | Kawaguchi et al. | 260/897 A |
| 3,954,713 | 5/1976 | Schnoving et al. | 528/502 |
| 3,998,778 | 12/1976 | Berg et al. | 528/503 |
| 4,009,232 | 2/1977 | Shiiki et al. | 264/9 |
| 4,016,099 | 4/1977 | Willman et al. | 264/4 |

FOREIGN PATENT DOCUMENTS

| | | | |
|---|---|---|---|
| 49-130879 | 12/1974 | Japan | 264/4 |
| 1237498 | 6/1971 | United Kingdom | 264/4 |

*Primary Examiner*—Jay H. Woo
*Attorney, Agent, or Firm*—Sughrue, Rothwell, Mion, Zinn and Macpeak

[57] ABSTRACT

One can obtain finely divided polymer particles by dissolving a polymer in a water immiscible volatile solvent which has a boiling point lower than that of water, then dispersing the solution into an aqueous medium, and removing the solvent from the dispersed oil phase droplets.

13 Claims, No Drawings

METHOD OF PRODUCING FINELY DIVIDED POLYMER PARTICLES

BACKGROUND OF THE INVENTION

1. Field of the Invention

This invention relates to a method of producing finely divided polymer particles, in particular, to such a method which comprises first dispersing as an oil phase a polymer solution containing one or more kinds of polymers into an aqueous dispersing medium with suitable control of the viscosity as well as the surface tension of each phase and then removing the solvent included in the oil phase droplets, thus obtaining spherical, finely divided polymer particles having high quality and shape and particle size uniformity.

2. Description of the Prior Art

Various methods of producing finely divided polymer particles are known in the art. In one method based on suspension polymerization, for example, one can obtain particles of from about 1,000 microns to 10 microns in diameter by selection of a suitable dispersion stabilizer and appropriate control of the concentration of polymerization initiator, the polymerization temperature, the weight ratio of monomer to water, etc. However, it is quite difficult to produce particles finer than 10 microns in diameter having a narrow size distribution. In the 10 microns in diameter having a narrow size distribution. In the above cited suspension polymerization method, there are two methods for dispersion stabilization for the oil phase suspended in the aqueous medium; one involves using a water soluble polymer dispersion stabilizer, and the other involves using a water insoluble inorganic powder dispersion stabilizer. In the former method, however, the preparation of particles of a narrow size distribution with a mean diameter smaller than 10 microns has been extremely difficult and no description has as yet been found in any publication relating to such technology. In the latter method employing a water insoluble inorganic powder dispersion stabilizer, a similar technological difficulty exists and only a few practical methods under rather limited conditions are known; for example, Japanese Patent Publication 51,830/1972 discloses a method in which an inorganic dispersion stabilizer such as magnesium carbonate, zinc oxide, magnesium phosphate, etc., and a flow aid (often term a fluidizing agent in the art) such as ethyl cellulose are first blended with monomers, and then the monomers are suspension polymerized in an aqueous medium to give polymer particles of less than 10 microns. However, this method involves a large amount of dispersion stabilizer and complicated procedures such as blending and removal of the stabilizer with acid. Further, since this method can be used under only a very limited range of polymerization conditions, which, in turn, depend on the reactivities of the monomers involved, it is only applicable to limited monomer combinations.

Emulsion polymerization provides polymer particles having a uniform particle diameter of around 2 to 0.01 micron by suitable control of the amount of emulsifier (surface active agent), polymerization temperature, and stirring conditions, but can hardly form particles greater than 2 microns. Mechanical pulverization followed by classification can produce polymer particles where the size distribution is broad and the shape is not spherical but quite irregular. One can also produce spherical polymer particles by dissolving a polymer in a water immiscible organic solvent and jetting it from a fine nozzle into an aqueous medium under high pressure. However, the particle size is far from uniform and apparatus of high volume is required. In summary, there is no generally useful economical method of producing polymer particles having particle size ranging from 1 to 10 microns.

On the other hand, polymer particles of about such a size range have wide industrial applications including additives for photographic sensitive materials (added to the outermost layer or back coating layer thereof in order to prevent blocking), ion exchange resins, powders for electrostatic coating, colorants (which can be prepared from such polymer particles with the incorporation of pigments), binders for lubricants, cosmetics, fillers for liquid chromatography columns, standard particles for particle size analysis, etc.

SUMMARY OF THE INVENTION

Therefore, the principal object of the present invention is to provide a method of preparing finely divided homogeneous polymer particles of shape and particle size uniformity.

The present inventors have succeeded in producing finely divided polymer materials by dissolving one or more kinds of polymers into a solvent which is not soluble in or substantially immiscible with water, and which has a lower boiling point than water or forms with water an azeotropic mixture having a lower boiling point than water, dispersing the solution as an oil phase into an aqueous medium with appropriate adjusting of the viscosity and the surface tension of each phase, and removing the solvent from the oil phase droplets to form finely divided polymer particles. Such particles can be separated in powder form by a subsequent centrifugal separation and drying.

DETAILED DESCRIPTION OF THE INVENTION

In the aforementioned suspension polymerization method of the prior art, the viscosity of monomer droplets noticeably increases during the polymerizing procedure in which the monomer droplets (liquid) grow into polymer particles (solid), and this viscosity increase hinders smooth dispersion and coagulation of the droplets resulting in the formation of coarse, aggregated and non-uniform particles. This problem is unavoidable in suspension polymerization.

On the contrary, in the method of the present invention, the size of the polymer solution droplets agitated and dispersed according to the above described process is determined after the dynamic equilibrium state for the dispersion-coagulation procedure of the polymer droplets has been established, depending on the concentration of the polymer solution, the ratio of the polymer solution to the aqueous medium, the kind and the amount of the dispersion stabilizer, the temperature, the agitation speed, the pH of the aqueous medium, etc. The pH of the system is conveniently maintained at about 3 to about 11, even more preferably at 5 to 9. The dynamic equilibrium is usually established in 10 to 20 minutes. It should be noted that the viscosity of the liquid droplets during the dispersion procedure is determined by the solvent composition and remains constant, in clear contrast to the case of suspension polymerization wherein aggregation proceeds leading to a wide particle size distribution. The present is characterized by an extremely uniform particle size. Moreover, in an ordinary suspension polymerization, the reaction is completed in 4 to 15 hours, while the method of the present invention requires only 2 to 3 hours even when the time for dispersion and heating is taken into account.

Factors which determine particle size in the present invention are as follows: particle size increases with the concentration of the polymer solution, with the weight ratio of the polymer solution to the aqueous medium, and with the temperature of the aqueous medium, while it decreases with the amount of the dispersion stabilizer or the stabilizing aid, with the temperature of the polymer solution or with the speed of agitation. The above factors have been confirmed qualitatively. As for the pH of the aqueous medium, this varies with the kind of the dispersion stabilizer employed; in the case of an amphoteric polymeric electrolyte such as lime gelatin, particle size becomes a maximum at the isoelectric point (pH=4.9), decreasing as pH shifts therefrom to both the acid and alkaline sides. These general tendencies, however, have been observed when one factor of interest is changed with other remaining ones being kept constant, and, since in practice, every factor complicatedly influences the others, it is impossible to give immutable preferable values for individual factors.

In the present invention, one can control, at will, the particle size of the final, spherical polymer particles within 1 to 10 microns by suitably adjusting these individual factors and deciding the surface tension between the oil (polymer solution) and the water (aqueous medium) phases, the viscosity of each phase, etc. Furthermore, the resulting particles are quite uniform in shape as well as size. It should be mentioned that the polymer particles will not change their shape due to the removal of the solvent, thus the final shape is still spherical.

The polymer(s) used in the present invention play the role of a starting raw material for the final finely divided product, and one can make use of any polymers that are not soluble or are substantially insoluble in water and which are soluble in a solvent which has a lower boiling point than water or which forms an azeotropic mixture having a lower boiling point than water. Preferred polymers for use in the present invention have a glass transition point of at least about 60° C. and a molecular weight of at least 10,000. Even more preferred polymers for use in the present invention have a glass transition point of at least 80° C. and a molecular weight of at least 50,000.

Such polymers include homo- or copolymers comprising monomers such as styrene, o- and p-chlorostyrene, vinyl toluene, α-methylstyrene, acrylic esters, methacrylic esters, acrylonitrile, butadiene, isoprene, vinyl acetate, or copolymers comprising at least 50 wt% of the above monomers and another monomer or monomers copolymerizable therewith, etc. Preferred acrylic esters and/or methacrylic esters are those represented by the formula

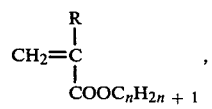

where R=H or CH₃ and n=1 to 4. Particularly suitable polymers are polymers of methyl methacrylate, ethyl methacrylate, styrene, acrylic esters and methacrylic esters as above defined, acrylonitrile and acrylonitrile/vinyl acetate copolymers, most especially homopolymers and comprising at least 50 wt% of monomers as above defined with one or more. A most highly preferred class of polymers for use in the present invention include polyethylmethacrylate and copolymers comprising at least 50 wt% of methacrylate, ethyl methacrylate, styrene or acrylonitrile. Further, blended polymer materials can also be used which have any hardness, density, refractive index, etc. One can also incoporate in the polymer solution additives such as a dye, pigment, plasticizer, antistatic agent, UV absorber, etc.

One can use any solvent(s) for the present invention, provided that it is insoluble in or substantially immiscible with water and has a boiling point lower than water or forms an azeotropic mixture with water having a lower boiling point than water and which dissolves any of the above polymers. On a commercial scale, for ease of separation usually any solvent or azeotropic mixture would have a boiling point at least about 4° to 5° C. lower than that of water. Solvents which are substantially immiscible with water can easily be determined by a simple test: when an equal volume of water and solvent are mixed and stirred, a substantially immiscible solvent provides a white, muddy system, and, essentially, forms an emulsion. Such solvents include, for example, dichloromethane, chloroform, carbon tetrachloride, 1,1-dichloroethane, 1,2-dichloroethane, 1,1,1-trichloroethane, ethyl acetate, benzene, methyl ethyl ketone, methyl isobutyl ketone, n-butyl alcohol, isobutyl alcohol, etc. Particularly suited are halogenated aliphatic hydrocarbons such as dichloromethane, carbon tetrachloride, 1,2-dichloroethane, 1,1,1-trichloroethane, etc.

Dispersion stabilizers suitable for the present invention are those which form a hydrophilic colloid in water, including, for example, proteins such as gelatin, gelatin derivatives (e.g., acetylated gelatin, phthalated gelatin, succinated gelatin, etc.), albumin, casein, etc., colloidon, gum arabic, agar-agar, alginic acid, cellulose derivatives (e.g., alkyl esters of carboxymethylcellulose, preferably the methyl or ethyl esters, hydroxyethylcellulose, carboxymethylcellulose, etc.), synthetic polymers (e.g., polyvinyl alcohol, polyvinyl pyrrolidone, polyacrylamide, salts of polyacrylic acid, salts of polymethacrylic acid, salts of polymaleic acid, salts of polystyrene sulfonic acid, preferably the sodium or potassium salts, etc., and copolymers comprising at least one of the monomers of the above polymers). Among these, amophoteric polymeric electrolytes such as gelatin, gelatin derivatives, casein, and other protein compounds have a prominent effect. They can be used solely or as a combination thereof. Preferred dispersion stabilizers include gelatin, gelatin derivatives, casein and other protein compounds. The dispersion stabilizer is conveniently utilized in an amount of from about 1 wt% to about 15 wt% of the dispersion, even more preferably 5 wt% to 10 wt%.

In the present invention 0.1 to 1 wt% based on water of surface active agents are usually used as a dispersion stabilizing aid.

Suitable surface active agents include saponin and others of natural origin, nonionic surface active agents such as alkylene oxide, glycerol compounds such as mono-glycerides, glycidol compounds, etc., anionic surface active agents having an acid group such as a carboxylic acid, sulfonic acid, phosphoric acid, sulfonic acid ester or phosphoric acid ester group(s), etc. Many useful surface active agents are disclosed in the following patents: U.S. Pat. Nos. 2,271,623, 2,240,472, 2,288,226, 2,676,122, 2,676,924, 2,676,975, 2,691,566, 2,721,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, German Patent Application (OLS) 1,942,665, and British Pat. Nos. 1,077,317 and 1,198,450. Further descriptions are found in *Kaimen Kassei Zai no Gosei to Sono Ohyo* (*Synthesis and Application of Surface Active Agent*), authored by Ryohei Oda, et al., (published by Maki Publishing Co., in 1964), *Surface Active Agents*, authored by J. W. Perry and A. M. Schwartz (published by Interscience Publications, Inc., in 1958), *Encyclopedia of Surface Active Agents*, Vol. 2, authored by J. P. Sisley (published by Chemical Publishing Co., in 1964), *Kaimen Kassei Zai Binran* (*Surfactants Encyclopedia*), 6th Edition (published by Sangyo Tosho Co., on Dec. 20, 1966), etc.

These surface active agents can also be used solely or in combination, and particularly suitable compounds are those having an SO$_3$M group including sulfonate esters of ordinary alkanols represented by the formula R—O—SO$_3$M or R—(OCH$_2$CH$_2$)l—OSO$_3$M (wherein R represents an alkyl group containing 8 to 30 carbon atoms, M is an alkali metal or ammonium, and l is a positive integer up to 20, respectively) and alkylbenzene sulfonic acid compounds represented by the formulae

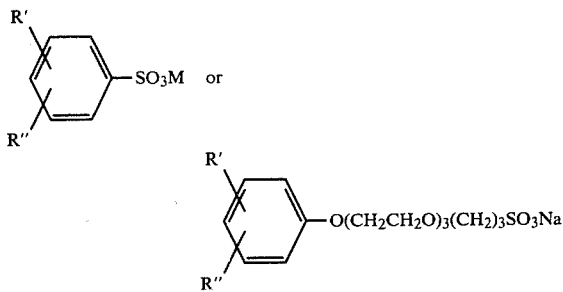

(wherein R' represents hydrogen or an alkyl group having from 1 to 18 carbon atoms, R" is an alkyl group having from 1 to 18 carbon atoms, M is an alkali metal or ammonium, m is a positive integer of from 0 to 20, and n is equal to 3 or 4).

Generalized procedures involved in the manufacturing method of the present invention will now be described.

First, a polymer is dissolved in a solvent which is not soluble in or substantially immiscible with water and which has a lower boiling point than water or forms an azeotropic mixture with water having a lower boiling point than water. Since the properties of the final product in finely divided form are determined by those of the polymer used, one must select a suitable polymer as a starting material considering the properties required such as hardness, density, refractive index, etc. If necessary, two or more polymers may be used as a blend. Separately, a dispersion stabilizer and a stabilizing aid (usually a surface active agent) are dissolved in water, respectively.

Both aqueous solutions are charged into a vessel provided with a conventional agitator and warmed to a predetermined temperature which is below the boiling point of the solvent used for the polymer solution. When the aqueous solution reaches that temperature, the polymer solution is added to the aqueous solution with vigorous stirring. Agitation continues for 20 to 60 minutes. In order to carry out such dispersion, one can resort to a conventional emulsifier in lieu of a vessel with an agitator. The dispersed polymer solution will have a droplet size determined primarily by the viscosities of, and the surface tension between, the aqueous medium phase and the oil phase, and these parameters, in turn, are determined by the concentrations of the dispersion stabilizer and of the stabilizing aid and the temperature of the aqueous phase. This droplet size decides the dimension of the polymer particles finally obtained. After 20 to 60 minutes agitation, the dispersion is gradually heated under mild stirring to a temperature above the boiling point of the solvent involved to expel it from the droplets. When a substantial amount of the solvent has been volatilized, the oil droplets are converted into solid particles, which will not change their shape or dimensions after the conversion. Finally the dispersion is subjected to centrifugal separation in a conventional manner and the separated particles dried.

The above disclosure will enable one to practice the present invention with ease. However, as with any process invention, certain most highly preferred conditions exist for operation on a commercial scale, which are set out below. It should be understood, however, that operation outside the ranges cited below is possible, though non-preferred.

First, the polymer/solvent in accordance with the present invention is generally utilized at a weight ratio of from about 5/95 to about 40/60, even more preferably 10/90 to 30/70. The aqueous medium comprises, as a minimum, of course, water, but generally a dispersion stabilizer and a dispersion stabilizer aid will be present therein. The ratio of the polymer solution to the aqueous medium is most conveniently maintained at a weight ratio of from about 1/99 to about 70/30, more preferably 10/90 to 50/50. Solvent is conveniently removed at atmospheric pressure, and substantially immiscible solvents have a solubility in water of 20 wt% or less at 20° C., even more preferably 15 wt% or less. Useful azeotropes are not especially limited, but on a commercial scale an n-butanol-water or an iso-butanol-water azeotrope is most conveniently utilized. Polymer solutions conveniently can have a viscosity of from 10 cps to about 10,000 cps, and aqueous mediums most conveniently have a viscosity of about 10 cps to about 5,000 cps. Surface tension of both phases is easily adjusted by adding a dispersion stabilizer.

The present invention will be illustrated in more detail by the following Examples. Unless otherwise indicated, in the following Examples all percentages are weight percentages.

EXAMPLE 1

To 375 g of 1,2-dichloroethane in a 500 ml beaker there was gradually added 125 g of polymethylmethacrylate (average molecular weight: $1.1 \times 10^5$, softening point: 90° C.; the same polymethylmethacrylate was used in the following Examples, unless otherwise indicated) with stirring to prepare a solution (at room temperature). Separately 1.5 g of sodium dodecylbenzene sulfonate was dissolved in 50 ml of water in a 100 ml beaker and the solution kept at 60° C. In another 500 ml beaker, 40 g of gelatin was allowed to swell at room temperature for 30 minutes in 450 ml of water. This mixture was then heated to 60° C. to form a solution. The aqueous gelatin solution and the sodium dodecylbenzene solfonate solution were then poured into a 2 liter separable flask equipped with a paddle blade type stirrer and a cooling jacket, and the stirrer was rotated at 60 rpm. The contents of the flask were cooled to 30°±1° C. by circulating water of the same temperature through the jacket. The polymer solution was then added into the flask under 1,000 rpm stirring, which was continued for 30 minutes. Agitation was then slowed down to 60 rpm while the temperature was raised from 30° C. to 90° C. to remove the 1,2-dichloroethane in 2 hours. The polymer particles were separated by centrifuging at 12,000 rpm (14,000 G), dried at reduced pressure (5 mmHg) at 40° C. for 10 hours and then subjected to average particle size and standard deviation measurement with a Coulter Counter Size Distribution Analyzer, a product of Coulter Electronics, Co. The results are shown in Table 1.

EXAMPLES 2 TO 6

By using different stabilizing aids, the procedures of Example 1 was repeated. The results are shown in Table 1 together with those for Example 1.

age size (diameter) and standard deviation were calculated by the following formulae.

Average size = $3\sqrt{\Sigma f_i X_i^3 / \Sigma f_i}$

Standard deviation = $\sqrt{\Sigma f_i X_i^2 - (\Sigma f_i X_i)^2 / \Sigma f_i}$ In the formulae, $X_i$ is a classified value represented by $X_i = 1.5 + 0.5 i$ (i=0, 1, 2 ... n), and $f_i$ is the number of particles counted in the range of $X_i$.

The results shown in Table 1 disclose that a very slight change in the amount of dispersion stabilizing aid in each Example can easily control particle size. In each Example, the obtained polymer particles did not adhere to the inside surface of the flask.

EXAMPLES 7 TO 11

Under the same conditions as in Example 1, further experiments were carried out using different dispersion stabilizers and stabilizing aids. The results are shown in Table 2.

TABLE 2

| Ex. | PMMA | CH$_2$ClCH$_2$Cl | H$_2$O | Dispersion Stabilizer | Stabilizing aid | | Yield | Average Size | Standard Deviation |
|---|---|---|---|---|---|---|---|---|---|
| 7 | 125 g | 375 g | 500 ml | gelatin 40 g + Na polystyrene sulfonate* 0.8 g | — | | 97% | 7.15 μ | 3.54 μ |
| 8 | " | " | " | gelatin 40 g + Na polystyrene sulfonate* 2.4 g | — | | 95% | 3.11 μ | 1.02 μ |
| 9 | " | " | " | gelatin 40 g + Na polystyrene sulfonate* 0.4 g | C$_9$H$_{19}$—⟨C$_6$H$_4$⟩—O(CH$_2$CH$_2$O)$_m$—(CH$_2$)$_n$—SO$_3$M | 3.0 g | 96% | 3.71 μ | 1.42 μ |
| 10 | " | " | " | gelatin 40 g + Na polystyrene sulfonate* 0.4 g | " | 4.5 g | 94% | 3.24 μ | 1.12 μ |
| 11 | " | " | " | Na polymethacrylate 30 g | C$_{12}$H$_{25}$—⟨C$_6$H$_4$⟩—SO$_3$Na | 4.0 g | 94% | 6.04 μ | 2.91 μ |

*The molecular weight of the Na polystyrene sulfonate was about 900,000.

TABLE 1

| Example | PMMA | CH$_2$ClCH$_2$Cl | H$_2$O | Dispersion Stabilizer | Stabilizing Aid | | Yield | Average Size | Standard Deviation |
|---|---|---|---|---|---|---|---|---|---|
| 1 | 125 g | 375 g | 500 ml | 40 g | C$_{12}$H$_{25}$—⟨C$_6$H$_4$⟩—SO$_3$Na | | 97% | 8.51 μ | 4.25 μ |
| 2 | " | " | " | " | " | 1.5 g | 95% | 3.05 μ | 0.92 μ |
| 3 | " | " | " | " | " | 3.0 g | 94% | 2.02 μ | 0.51 μ |
| 4 | " | " | " | " | " | 4.5 g | 98% | 10.40 μ | 5.40 μ |
| 5 | " | " | " | " | C$_9$H$_{19}$—⟨C$_6$H$_4$⟩—O(CH$_2$CH$_2$O)$_3$—(CH$_2$)$_3$SO$_3$Na | 4.5 g | 95% | 5.43 μ | 2.26 μ |
| 6 | " | " | " | " | " | 6.75 g / 9.0 g | 93% | 2.81 μ | 0.81 μ |

Notes:
Polymethyl methacrylate is abbreviated PMMA.
Based on the size distribution measured with the Coulter Counter Size Distribution Analyzer, average It is evident that the method of the present invention can be advantageously performed by using these stabilizers or stabilizing aids.

EXAMPLES 12 TO 14

In the following Examples the polymers and solvents were changed; the conditions were otherwise the same as in Example 1.

TABLE 3

| Example | Polymer | Solvent | H₂O | Dispersion Stabilizer | Stabilizing Aid | Yield | Average Size | Standard Deviation |
|---|---|---|---|---|---|---|---|---|
| 12 | Styrene/MMA (8:2 molar) copolymer 125 g | Dichloromethane 375 g | 500 ml | Gelatin 40 g | $C_{12}H_{25}$——$SO_3Na$ 3.0 g | 94% | 3.02 μ | 0.93 μ |
| 13 | Styrene/BMA (6:4 molar) copolymer 125 g | 1,1,1-trichloroethane 375 g | " | Gelatin 40 g | " 3.0 g | 93% | 2.54 μ | 0.57 μ |
| 14 | Styrene/MMA (1:1 molar) copolymer 125 g | Dichloromethane 375 g | " | Gelatin 40 g | " 3.0 g | 94% | 3.63 μ | 1.39 μ |

Notes:
Intrinsic viscosity values for the three polymers were 0.37, 0.42 and 0.27, respectively (solvent:toluene, at 30° C.).
Methyl methacrylate is abbreviated MMA and butyl methacrylate is abbreviated BMA.

It was proved that polymer particles of desired particle size were obtained by the method of the present invention by using these various polymers dissolved in the solvents cited above.

While the invention has been described in detail and with reference to specific embodiments thereof, it will be apparent to one skilled in the art that various changes and modifications can be made therein without departing from the spirit and scope thereof.

What we claim is:

1. A light-sensitive photographic silver halide material comprising a support, a light-sensitive silver halide emulsion layer and a top protective layer or a backing layer containing therein finely divided, spherically shaped, homogeneous, polymer material consisting essentially of 1 or more polymers which has a high degree of uniformity in shape and particle size, and having an average particle size of from 1 to 10 microns, said particles produced by a method which consists essentially of
   (a) forming a polymer solution by dissolving one or more polymers comprising at least 50 weight % of a monomer selected from the group consisting of styrene, o- and p-chlorostyrene, vinyl toluene, α-methylstyrene, acrylic esters, methacrylic esters, acrylonitrile, butadiene, isoprene and vinyl acetate in a halogenated aliphatic hydrocarbon solvent which is insoluble in or substantially immiscible with water, and which has a lower boiling point than water or which forms an azeotropic mixture with water having a lower boiling point than water,
   (b) separately dissolving gelatin, a gelatin derivative, casein or a protein compound which is an amphoteric polymeric electrolyte which forms a hydrophilic colloid in water as a dispersion stabilizer in water and an anionic surface active agent having a SO₃M group wherein M represents an alkali metal or ammonium, as a dispersion aid in water,
   (c) combining the two solutions of step (b) to form an aqueous medium,
   (d) dispersing said polymer solution in the aqueous medium in droplet form, the viscosities of the aqueous medium and of the polymer solution and the surface tension between the aqueous medium and the polymer solution being controlled, whereby the polymer solution is dispersed as oil droplets in the aqueous medium, and
   (e) then removing the solvent from each droplet, whereby the oil droplets are converted to solid particles having an average particle size of about 1 to 10 microns which particles will not change in shape or dimension after the conversion.

2. The light-sensitive photographic silver halide material of claim 1 wherein the dispersion stabilizer aid is used in an amount of about 0.1 to about 1% based on water.

3. The light-sensitive photographic silver halide material of claim 1 wherein the dispersion stabilizer is used in a an amount of from about 1 weight % to about 15 weight % of the dispersion.

4. The light-sensitive photographic silver halide material of claim 1 wherein said monomer is methylmethacrylate, ethylmethacrylate, styrene, acrylic ester, methacrylic ester, acrylonitrile or vinyl acetate.

5. A method of manufacturing a spherically shaped, homogeneous, finely-divided material consisting essentially of one or more polymers which has a high degree of uniformity in shape and particle size, and average particle size of from 1 to 10 microns, which consists essentially of
   (a) forming a polymer solution by dissolving one or more polymers comprising at least 50 weight % of a monomer selected from the group consisting of styrene, o- and p-chlorostyrene, vinyl toluene, α-methylstyrene, acrylic esters, methacrylic esters, acrylonitrile, butadiene, isoprene and vinyl acetate in a halogenated aliphatic hydrocarbon solvent which is insoluble in or substantially immiscible with water, and which has a lower boiling point than water or which forms an azeotropic mixture with water having a lower boiling point than water,
   (b) separately dissolving gelatin, a gelatin derivative, casein or a protein compound which is an amphoteric polymeric electrolyte which forms a hydrophilic colloid in water as a dispersion stabilizer in water and an anionic surface active agent having a SO₃M group wherein M represents an alkali metal or ammonium, as a dispersion aid in water,
   (c) combining the two solutions of step (b) to form an aqueous medium,
   (d) dispersing said polymer solution in the aqueous medium in droplet form, the viscosities of the aqueous medium and of the polymer solution and the surface tension between the aqueous medium and the polymer solution being controlled whereby the polymer solution is dispersed as oil droplets in the aqueous medium, and (e) then removing the solvent from each droplet, whereby the oil droplets are converted to solid particles having an average particle size of about 1 to 10 microns which particles will not change in shape or dimension after the conversion.

6. The method of claim 5, wherein said one or more polymers have a glass transition point of at least about 60° C. and a molecular weight of at least 10,000.

7. The method of claim 6, wherein said one or more polymers have a glass transition point of at least 80° C. and a molecular weight of at least 50,000.

8. The method of claim 5, wherein said solvent is selected from the group consisting of dichloromethane, chloroform, carbon tetrachloride, 1,1-dichloroethane, 1,2-dichloroethane, and 1,1,1-trichloroethane.

9. The method of claim 5, wherein the weight ratio of said polymer solution to said aqueous medium is from about 1/99 to about 70/30.

10. The method of claim 5, wherein the weight ratio of said polymer to said solvent is from about 5/95 to about 40/60.

11. The method of claim 5 wherein said monomer is methylmethacrylate, ethylmethacrylate, styrene, acrylic ester, methacrylic ester, acrylonitrile or vinyl acetate.

12. The method of claim 5 wherein the dispersion stabilizer is used in an amount of from about 1 weight % to about 15 weight % of the dispersion.

13. The method of claim 5 wherein the dispersion stabilizer aid is used in an amount of about 0.1 to about 1% based on water.

* * * * *